April 18, 1967  D. E. BODIN  3,315,267
TIME INDICATING RECORDER FOR CASH REGISTERS
Filed Sept. 15, 1964  2 Sheets-Sheet 1
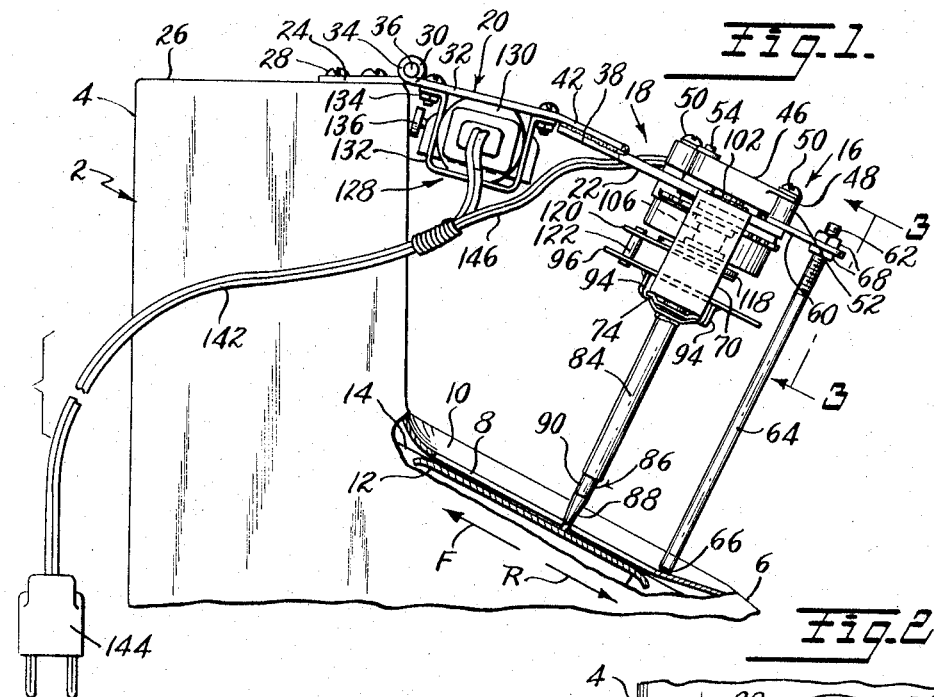
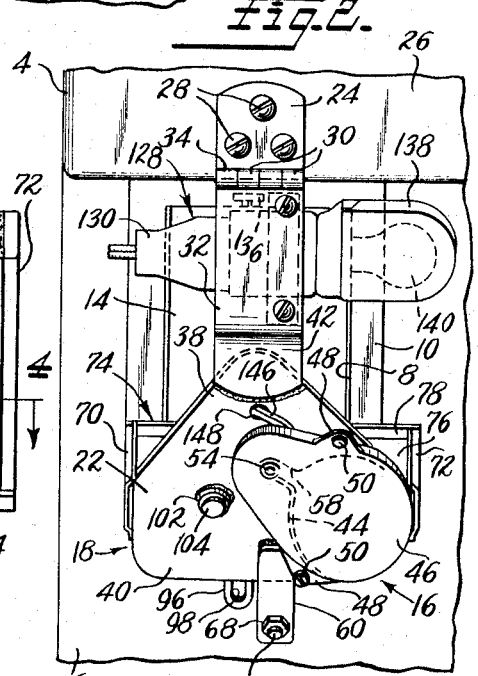
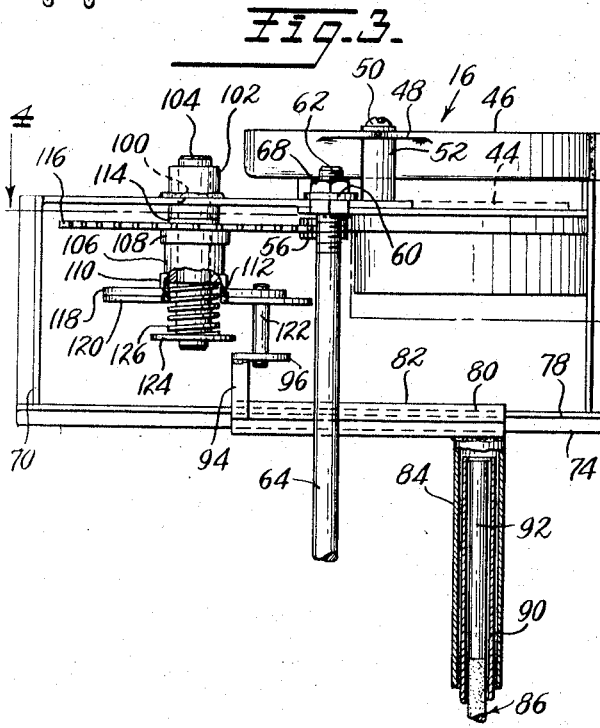
INVENTOR
Donald E. Bodin
BY Bacon & Thomas
ATTORNEYS

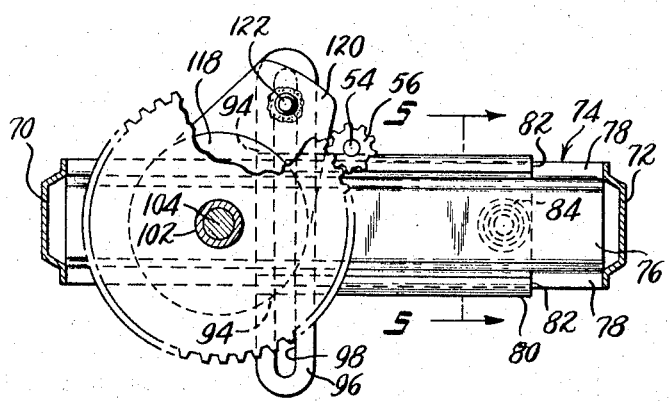

United States Patent Office 3,315,267
Patented Apr. 18, 1967

3,315,267
TIME INDICATING RECORDER FOR CASH REGISTERS
Donald E. Bodin, 653a Congress St., Portland, Maine 04101
Filed Sept. 15, 1964, Ser. No. 396,643
20 Claims. (Cl. 346—61)

This invention relates generally to a transaction time indicating attachment for cash registers and the like, designed to indicate on the recording tape of a cash register the time of occurrence of each transaction printed thereon.

More particularly, this invention relates to an attachment for a cash register or the like, of the type which employs a recording tape upon which is printed at the time it occurs a record of each transaction for which the cash register is operated. This invention is constructed to place a time-related inscription on the recording tape of such a cash register, which inscription can subsequently be interpreted to determine the time of occurrence of each transaction printed upon the tape.

A common feature of cash registers and like devices presently in use is the employment therein of a paper recording tape, upon which a record of each transaction made is printed; that is, upon each opening of the drawer of the cash register, a printing apparatus within the register operates to print upon a paper recording tape a record of the transaction associated with the opening of the register. The recording tape thus is helpful to those responsible for the management of an establishment in which the cash register is located, as it gives a printed record of transactions made.

While the recording tapes of cash registers of the type just described give a printed record of transactions made on the register, they do not indicate the times when such transactions occurred. If the times of occurrence of the various transactions were known, this information would be of great benefit to the management of an establishment. For example, it would then be possible to accurately determine the heavy and light periods of business activity, so that the scheduling of employees could be more satisfactorily made. Further, by knowing what business transactions occur during specified time periods, customer preferences and business patterns could be more easily determined, and decisions as to the type of advertising to be engaged in would be facilitated. In addition, in instances where pilfering of the cash drawer of a cash register is occurring, knowledge of the time of occurrence of each transaction printed on the cash register recording tape would be helpful in determining the guilt or innocence of those suspected of the pilfering.

The recording tape normally utilized on cash registers of the type described comprises an elongated paper roll, which is progressively fed through the cash register as it is operated for each transaction. The keyboard face of the register normally is provided with a framed opening thereon, within which frame the portion of the recording tape bearing the printed record of the most recent transactions is exposed. The attachment of the invention is designed to place a time-related inscription, in the form of a line, on the recording tape portion exposed within said frame, which inscription can later be interpreted to determine the time when each transaction printed on the tape occurred.

The present attachment is constructed to be secured to a cash register, and to be positionable over the frame within which the recording tape portion bearing the printed records of the most recent transactions is exposed. The attachment includes a stylus operated by a clock motor, and arranged so that it is moved along a fixed path at a known time rate. The stylus is normally engaged with the recording tape portion exposed within the frame, and is constantly moving on said exposed tape portion while the clock motor is operating to draw a line thereon. When the cash register is operated, whereby a record of the transaction is automatically printed on the recording tape by printing mechanism contained within the register, the line being drawn by the stylus abruptly changes its position on the recording tape, leaving a mark which indicates the time at which the transaction occurred. By subsequently measuring the relative positions of the change marks on the recording tape, it is possible to determine the times at which the printed transactions associated with said change marks occurred.

Certain cash registers are equipped to record an identifying letter or number on the recording tape adjacent each transaction, each such letter or member being assigned to the sales person making the transaction. With such cash registers, the present invention makes it possible to determine which sales persons were on duty during a particular time period, and what sales each sales person made during a specific period.

It is an object of the present invention to provide an attachment for cash registers or the like of the type employing a recording tape upon which records of transactions are printed, constructed to place a time-related inscription on said recording tape to indicate the time of occurrence of each transaction printed thereon.

A further object is to provide a cash register attachment for use in indicating the time of occurrence of transactions made on the cash register, which attachment is relatively simple in construction and economical to manufacture.

Another object is to provide a cash register attachment incorporating a stylus and a clock motor that operates continuously and is constructed so that the clock motor will cause the stylus to be moved along a fixed path at a known rate of travel throughout a twenty-four hour period, day after day.

It is also an object to provide an attachment for placing a time-related inscription on the recording tape of a cash register or the like, constructed so that the attachment can be easily set and reset to position the stylus thereof at any desired position along its path of travel.

A further object is to provide an attachment for placing a time-related inscription on the recording tape of a cash register, constructed so that it can be easily attached to said cash register, and so that it can be easily placed in and removed from operating position.

Other objects and many of the attendant advantages of the present invention will become apparent from the following detailed description, when considered in connection with the accompanying drawings, wherein:

FIG. 1 is a fragmentary, side elevational view, partially in section, of the upper portion of a cash register, with the attachment of the invention shown mounted thereon and arranged in its operative position;

FIG. 2 is a fragmentary plan view of the apparatus of FIG. 1, showing in particular the construction of the case of the cash register attachment;

FIG. 3 is an enlarged front elevational view, partially in section, taken along the line 3—3 of FIG. 1;

FIG. 4 is a horizontal sectional view, taken along the broken line 4—4 in FIG. 3, showing in particular the track and slide member, the output gear of the clock motor, and the linkage between said output gear and the slide member;

FIG. 5 is an enlarged, fragmentary, vertical sectional view, taken along the line 5—5 of FIG. 4, showing the construction of the track and the slide member;

FIG. 6 is a fragmentary plan view of a recording tape from the cash register of FIG. 1, showing inscriptions made thereon by the attachment of FIGS. 1–5;

FIG. 7 is an enlarged, fragmentary plan view of a second embodiment of the invention, showing the mounting plate, the clock motor, the stylus, and the arrangement for driving the stylus from the output gear of said clock motor; and FIG. 8 is a fragmentary, plan view of a portion of a recording tape upon which inscriptions have been made by the modified embodiment of FIG. 7.

Referring now to the drawings, a cash register is indicated generally at 2, said cash register being shown in side elevation and incorporating a projecting upper end 4 and a sloping keyboard face 6. The keys (not shown) for operating the cash register 2 are mounted on the keyboard face 6 in the usual manner, and the projecting upper end 4 is provided with windows (not shown) in the front and rear faces thereof through which are viewed the cards normally employed in a cash register to display a reocrd of transactions for which the register is operated. The cash register 2 is of the type which incorporates a roll of paper tape, upon which is printed a record of each transaction for which the cash register is operated.

The keyboard face 6 has a rectangular opening 8 therein near the upper left-hand corner thereof, said opening being surrounded by a depressed rim which constitutes a frame 10. A backing plate 12 is disposed behind the opening 8, and is spaced slightly from the frame 10. The paper recording tape 14 utilized with the cash register 2 passes over the backing plate 12, and is progressively exposed within the frame 10 as the cash register 2 is operated.

The cash register 2 incorporates a printing apparatus (not shown), which operates each time the cash drawer of the register is opened to print on the tape 14 a record of the transaction as established by punching the proper keys on the keyboard face 6. In cash registers of the type described herein, the portion of the recording tape 14 bearing the printed record of the most recent transactions is normally exposed within the frame 10, and because of this the printing apparatus for the cash register 2 must be disposed at a distance removed from the frame 10. Since the printing apparatus is removed from the frame 10, it is necessary for the tape 14 to move to said printing apparatus each time the cash register is operated.

More specifically, referring to FIG. 1, the apparatus for printing the record of a transaction on the recording tape 14 is positioned within the lower part of the cash register 2, a distance below the bottom edge of the inclined frame 10. When a transaction is made on the cash register, and just before a record of that transaction is to be printed on the recording tape 14, said tape is automatically moved rearwardly in the direction of the arrow R a short distance into the lower part of the cash register. A record of the transaction is printed on the tape by the printing apparatus after the tape terminates its rearward travel. After the printing is completed, the tape is automatically moved forwardly in the direction of the arrow F, whereby the transaction just printed thereon is exposed within the frame 10.

The cash register attachment of the invention is indicated generally at 16, and is constructed to place a time-related inscription on the portion of the recording tape 14 exposed within the frame 10. The inscription thus made on the recording tape 14 can be interpreted to ascertain the time of occurrence of each transaction printed on said tape. The attachment 16 includes a base 18, which comprises a hinge 20 and a mounting plate 22. The hinge 20 includes a base leaf 24, the outer end of which is attached to the horizontal top surface 26 of the upper end 4 of the cash register 2 by screws 28. The other end of the base leaf 24 is provided with a plurality of aligned, spaced collars 30. The hinge 20 further includes a mounting leaf 32, provided with spaced, aligned collars 34 on the rear end thereof, said collars 34 being arranged to be interleaved with the collars 30; the hinge leaves 24 and 32 are secured together by a hinge pin 36.

The mounting plate 22 includes an inner, generally triangular portion 38, and an outer, generally rectangular portion 40. The forward end 42 of the hinge leaf 32 is bent downwardly at an angle, and the tip of the triangular portion 38 of the mounting plate 22 is secured to the undersurface thereof by welding, soldering, or some other suitable means. The mounting plate 22 has a generally circular notch 44 in one outer corner thereof, within which is received an electric clock motor unit 46.

The clock motor unit 46 is provided with a plurality of tabs 48 on the housing thereof, and is secured to the mounting plate 22 by screws 50, which pass through bores in said tabs 48, and which are threaded into aligned bores in the mounting plate 22. Cylindrical spacer sleeves 52 are received on the screws 50 between the tabs 48 and the mounting plate 22, and function to properly position the clock motor unit 46. The clock motor unit 46 includes an output shaft 54 having an output gear 56 mounted thereon, the mounting plate 22 having a notch 58 therein to provide for passage of said shaft 54 therethrough.

The mounting plate 22, being mounted on the hinge 20, is movable toward and away from the frame 10. It is desirable that when the mounting plate 22 is in an operative position it be positioned to be generally parallel to the backing plate 12, and a support post 64 is provided to support the mounting plate 22 in such a position. Referring again to the drawings, a tab 60 is secured to the forward end of the mounting plate 22 centrally thereof, and is provided with a bore through which extends the threaded, upper end 62 of the support post 64. The lower end 66 of the support post 64 is positioned to engage with the lower edge of the inclined frame 10, and said support post 64 is secured to the tab 60 by a pair of nuts 68, one disposed on each side of said tab. By merely adjusting the positions of the nuts 68 on the threaded end 62 of the support post 64, the mounting plate 22 can be easily arranged to lie parallel to the plate 12.

A channel-shaped standard 70 is secured to project downwardly from the end of the rectangular portion 40 of the mounting plate 22 positioned oppositely to the clock motor unit 46. A similar standard 72 is welded to the housing of the clock motor unit 46, and extends downwardly therefrom. The standards 70 and 72 project perpendicularly identical distances from the undersurface of the plate 22, and are aligned along an axis extending perpendicularly to the longitudinal axis of the tape 14. A channel-shaped track 74 is welded to extend between the bottom ends of the standards 70 and 72, and extends parallel to the mounting plate 22.

Referring to FIG. 5, the track 74 includes a generally U-shaped, central portion 76, having laterally projecting flanges 78 thereon. A like-shaped slide member 80 is received on the track 74, said slide member 80 including a pair of inturned flanges 82 which engage over the lateral flanges 78. The slide member 80 has a length less than about one-half of the track 74, and is freely slideable thereon.

The end of the slide member 80 closest to the channel-shaped standard 72 has a cylindrical tube 84 welded to the undersurface thereof, said tube 84 being arranged to project downwardly perpendicularly relative to the mounting plate 22. The tube 84 is of such a length that it terminates a substantial distance above the frame 10 when the mounting plate 22 is positioned to lie parallel with the backing plate 12. Received within the cylindrical tube 84 is a stylus 86.

The stylus 86 comprises a mechanical pencil unit 88, which includes a cylindrical housing sleeve 90 that is freely slidably received within the cylindrical tube 84. The mechanical pencil unit 88 normally is filled with a very soft lead, such as lead of the type commonly employed in a cosmetic eyebrow pencil, and is arranged to rest in engagement with the portion of the tape 14 exposed within the frame 10 when the mounting plate 22 is supported to lie parallel to backing plate 12. In order to hold the unit 88 in writing engagement with the tape 14, a weight 92 is received within the upper end of the sleeve 90, which weight urges the unit 88 downwardly by gravity into writing engagement with the tape 14. Alternatively, a spring or the like could be mounted within the cylindrical tube 84 to urge the stylus unit 88 downwardly. It is also to be understood that other types of writing units can be employed for the stylus 86 in place of the mechanical pencil unit 88, such as a fountain or ballpoint pen.

Welded to extend upwardly from the lateral edges thereof at the end of the slide member 80 opposite to the stylus 86 is a piar of uprights 96. The rear edge of a cross-head 96 is welded to the upper ends of the uprights 94, and extends perpendicularly to the longitudinal axis of the slide member 80. The cross-head 96 lies in a plane parallel to that of the mounting plate 22, and has an elongated slot 98 therein which extends perpendicularly to the longitudinal axis of the track 74, the center of said slot 98 lying directly over the longitudinal centerline of said track. The length of the slot 98 is greater than the desired distance of travel for the slide member 80 on the track 74.

The mounting plate 22 has a bore 100 therethrough, positioned directly above the track 74, and spaced a substantial distance from the motor output gear 56. A collar 102 is received within the bore 100, and is welded to the plate 22 to extend vertically above and below said plate. The upper end of a supporting shaft 104 is received within the collar 102, and is welded in position.

A cylindrical collar 106 is received on the shaft 104, and is provided on the upper and lower ends thereof with flanges 108 and 110, respectively. A socket 112 is provided in the end face of the lower flange 110, and a reduced diameter cylindrical portion 114 projects upwardly from the upper flange 108, and is engageable with the lower end face of the collar 102. Received on the cylindrical portion 114 and secured thereto to rotate therewith is a drive gear 116, said gear being engageable with the motor output gear 56. In the invention as shown in the drawings, the drive gear 116 is proportioned so that it will be rotated once every two hours by the constant speed clock motor unit 46, although it is to be understood that other rotational periods can also be utilized.

A circular disk 118 is attached to the lower flange 110 of the cylindrical collar 106, and a crank arm 120 is attached to said disk 118. A downwardly extending, vertical drive pin 122 is secured to the outer end of the crank arm 120, and thus is mounted eccentrically of the supporting shaft 104. A washer 124 is secured to the lower end of the supporting shaft 104, and a coil spring 126 is received on said shaft, and is held in position by said washer 124. The upper end of the spring 126 is received within the socket 112, and said spring functions to urge the cylindrical collar 106 into engagement with the collar 102, whereby the drive gear 116 is engaged with the motor output gear 56.

When it is desired to change the position of the drive gear 116 relative to the output gear 56, said drive gear can be moved downwardly on the shaft 104 against the force of the coil spring 126 until it is free of said gear 56. The drive gear 116 can then be rotated to the desired position and released, whereupon the coil spring 126 moves it back into engagement with the motor output gear 56.

The vertical distance between the crank arm 120 and the cross-head 96 is greater than the amount of vertical movement allowed to the cylindrical collar 106 on the shaft 104. The cylindrical drive pin 122 is of sufficient length so that it is received within the slot 98 when the cylindrical collar 106 is in engagement with the collar 102. Thus, a driving linkage is always present between the drive gear 116 and the slide member 80. It is readily apparent that when the drive gear 116 is rotated, the drive pin 122 will move within the slot 98, whereupon the cross-head 96 is carried with said drive pin 122 to thereby move the slide member 80.

Because it frequently is difficult to obtain sufficient light on the portion of the tape 14 exposed within the frame 10 to facilitate easy reading of figures printed on said tape, the attachment 16 is provided with a light unit 128. The unit 128 includes a base portion 130, which is secured to the hinge leaf 32 by a band clamp 132 and bolts 134. The base portion 130 includes a switch operable by a button 136, and has a shade 138 attached thereto. A lamp 140 is housed within the shade 138, and is mounted within the base 130, and electricity is supplied to the light unit 138 by a lead 142 extending to a male plug 144; the plug 144 is, of course, connected to a conventional electrical outlet (not shown). The clock motor unit 46 is supplied with electricity by a lead 146 connected to the lead 142, said lead 146 passing through a bore 148 in the mounting plate 22, and to the electric motor of the unit 46.

In operation, the attachment 16 of the invention is first mounted on the cash register 2, so that the stylus 86 will be positioned over the frame 10. The attachment 16 is constructed so that the entire back and forth stroke of the slide member 80 will not exceed the width of the recording tape 14. Further, the attachment 16 is mounted on the cash register 2 so that the back and forth movement of the stylus 86 will be confined between the lateral edges of the portion of the recording tape 14 exposed within the frame 10. Before operation of the invention begins, the mounting plate 22 is positioned as shown in FIG. 1 to lie parallel to the backing plate 12, so that the stylus 86 is in writing engagement with the portion of the tape 14 exposed within the frame 10, said exposed tape portion being supported by the backing plate 12.

After the attachment 16 is in operative position, current is supplied to the constant speed clock motor unit 46, which causes the output gear 56 to begin rotating at a constant speed. The slide member 80 is preferably initially positioned so that at an initial reference time, say 8:00 a.m., it will be disposed to the extreme right of the track 74 upon which it is carried; this, in turn, positions the stylus 86 at the right-hand side of the exposed portion of the recording tape 14, as viewed in FIGS. 1, 2 and 6. If the cash register 2 is then not operated, and if the clock motor unit 46 continues to run, the stylus 86 will move horizontally across the exposed recording tape portion, inscribing an uninterrupted horizontal line thereon, such as is indicated at 150 in FIG. 6. As described hereinabove, the drive gear 116 is arranged so that it will make one complete rotation in every two hours. Thus, assuming that the slide member 80 beings its operation while disposed at the extreme right-hand end of the track 74, the stylus 86 will move completely across the recording tape 14 from right to left and return in a period of two hours.

Referring now to FIG. 6, it is assumed in said figure that the attachment 16 has been operating for two hours on the portion of the tape 14 shown therein, and that it has moved from the point a', across the tape, and returned, which would take a total elapsed time of two hours. If, then, the cash register 2 is operated to record a "NO SALE," which would be indicated on the recording tape by a series of ciphers, the following will occur. When the keys on the cash register 2 are struck to open the cash drawer of the register for the "NO SALE" transaction, the portion of the recording tape 14 exposed within the frame 10 will move several lines in the direction of the arrow R toward the printing mechanism housed within the cash register 2, at the termination of which movement said printing mechanism will print on the recording tape the three ciphers indicated at a in FIG. 6. After the line of type a has been printed, the recording tape 14 will move forwardly in the direction of the arrow F, a distance equal to the number of lines which it moved rearwardly, plus one. The additional one line of movement occurring when the tape 14 moves in the direction of the arrow F is for the purpose of positioning the recording tape 14 for the printing of the next line of type thereon.

Movement of the recording tape 14 in the manner just described, assuming that the stylus 86 is at that instant in time positioned at the point a', produces the following result. The rearward and forward movement of the recording tape 14 causes a vertical line 152 to be drawn, or inscribed, on said tape by the stylus 86. When the forward movement of the recording tape 14 has ceased, the stylus 86 will be positioned at the point a'', one line below the point a'. During operation of the cash register 2, the slide member 80 is, of course, constantly being moved across the recording tape 14 by the clock motor unit 46, and the linkage between the output gear 56 of said clock motor unit and the slide member 80.

If now a period of time elapses before the cash register 2 is again operated, the stylus 86 will inscribe a horizontal line 154, which is spaced downwardly one line from the horizontal line 150. The length of the horizontal line 154 is an indication of the period of time from when the cash register 2 was operated to record the transaction a, to when the cash register is operated for the next transaction. By measuring the length of the horizontal line 154 against a scale which relates the movement of the stylus 86 to time, it is a simple matter to determine the value of the elapsed time period.

Returning again to FIG. 6, after a period of time has elapsed following the transaction a, the cash register 2 is again operated to record another "NO SALE," indicated by the line of ciphers b. When the cash register 2 is thus operated, the stylus 86, which just before the register is operated is positioned at the point b', inscribes a vertical line 156, and then moves to the point b''. Similarly, the stylus continues to inscribe lines on the recording tape 14 through transactions c and d, whereby the stylus 86 moves relatively on the tape successively through the points c', c'', d', and d''. By measuring the distances between the points a'' and b', b'' and c', c'' and d', etc., against a time-related scale based on the motion of the stylus 86 relative to the constant speed of the clock motor unit 46, it is seen that the elapsed times been the transactions a, b, c and d can be readily determined. Moreover, by relating the elapsed times between transactions to the initial reference time when the stylus 86 was positioned at the extreme right on the recording tape 14, it is possible to readily determine the time of day when each transaction recorded on the tape 14 of the cash register 2 occurred.

Returning to FIG. 6, a Roman numeral I or II is shown printed on the recording tape 14 opposite each transaction a, b, c, d, etc., which numerals indicate the sales person who operated the register to record the transactions. By comparing the inscription placed on the recording tape 14 by the invention with these Roman numerals, it can be determined when a particular sales person was on duty, and what sales he made during a specified period. Not all cash registers are equipped to print the numerals I and II, or their equivalent, but on those that are, a number of such numerals or letters are commonly available.

The return and forward movement of the tape 14, described herein, may not occur in certain cash registers or like devices. However, in every such device, the individual transactions will be printed on the recording tape on succeeding lines. Thus, vertical lines such as those extending between the points a' and a'', and between the points b' and b'', etc., will always be present, when the invention is utilized with such devices, and hence reference points or marks will be made from which the times of occurrence of transactions can be determined. Further, it is not necessary that the horizontal line associated with a particular printed line on a recording tape be positioned immediately adjacent that line, as shown in FIG. 6, although this is obviously desirable to facilitate reading of the tape; that is, the horizontal measuring line, or inscription, associated with a particular printed line could be removed on the recording tape several inches from that printed line. As long as the first printed line and the initial point for the stylus are known, it is a relatively simple matter to relate the inscriptions made on the recording tape by the stylus to their associated lines of printing.

While the stylus 86 in the embodiment of the invention shown in FIGS. 1 to 6 is arranged to move in a straight line transversely of the longitudinal axis of the recording tape 12, it is to be understood that stylus movements along other fixed paths are also possible, so long as a time-related inscription is placed on the recording tape. For example, a stylus can be made to move at a uniform rate along a circular path, an embodiment of the invention for producing such stylus motion being illustrated in FIGS. 7 and 8.

Referring to FIG. 7, a cash register attachment is indicated generally at 158, said attachment 158 including a mounting plate 160 which is attached to a cash register in a manner identical to that in which the mounting plate 22 is attached. The mounting plate 160, like the mounting plate 22, has a generally circular notch 162 therein, within which is received a clock motor unit 164 identical to the clock motor unit 46, the unit 164 being secured to the mounting plate 160 by screws 166. A drive gear 168, corresponding to the drive gear 116, is mounted on the mounting plate 160 on a supporting shaft 169 and is engageable with the output gear 170 attached to the output shaft 172 of the clock unit 164.

The mounting plate 160, unlike the mounting plate 22, has no track or slide members mounted thereon corresponding to the members 74 and 80; rather, the lower side of the mounting plate 160 is open to the portion of a recording tape exposed within the frame of a cash register. Attached to the drive gear 168 to rotate therewith is a crank arm 174. A cylindrical supporting tube 176, corresponding to the cylindrical tube 84, is welded to the undersurface of the outer end of the arm 174, and is arranged to extend downwardly perpendicularly from the plane of the mounting plate 160. Received within the eccentrically-mounted support tube 176 is a stylus 178, corresponding to the stylus 86. It is thus seen that when the clock motor unit 164 is activated, the output gear 170 and the drive gear 168 will cooperate to move the stylus 178 along a circular path at a fixed rate of travel, say one revolution every two hours.

In use, the modified attachment 158 of FIG. 7 is attached to a cash register in the same manner as the attachment 16, whereby the stylus 178 will be arranged to inscribe a recording tape 180, a portion of which is shown in plan view in FIG. 8. Referring to FIG. 8, after the clock motor unit 164 has been energized, and for so long as the tape 180 is not moved by operation of the cash register on which it is mounted, the stylus 178 will draw, or inscribe, a circular line 182 on the tape 180. In FIG. 8, it is assumed that the recording tape 180 has not moved for a period of at least two hours, whereby the stylus 178 has inscribed a complete circle 182, and is disposed at the point k'. If then the cash register on which the recording tape 180 is operated while the stylus 178 is positioned at k', the following will occur.

When the cash register is operated to record a "NO SALE" transaction, represented by three ciphers when printed on the recording tape 180, the tape 180 will go through the reverse and forward motion described for the recording tape 14, during which motion the "NO SALE" transaction is printed at k on said tape. During the reverse and forward motion of the tape 180, the stylus 178 will inscribe a vertical line 184, and at the conclusion of the transaction said stylus 178 will be positioned at the point k'', one line below the point k'. The stylus 178 will thereafter continue along its circular path until the cash register is again operated, inscribing an arcuate line 186. When the cash register is operated to print on the recording tape 180 the transactions l, m, n, and o, the stylus 178 will move on said recording tape through the points l', l'', m', m'', n', n'', o', o'', etc. By then measuring the distances between the points k', and l', l'' and m', etc., the elapsed times between the different transactions printed on the recording tape can readily be determined.

The recording tape 180 also has Roman numeral, I, II or III printed thereon opposite the printed transactions k, l, m, etc. These Roman numerals, as described above, serve to identify the person who operates the register to record each transaction on the recording tape.

Obviously, many modifications and variations of the present invention are possible under the light of the above teachings. It is therefore to be understood that, within the scope of the appended claims, the invention may be practiced otherwise than as specifically described.

I claim:

1. In an apparatus including a recording tape, means for printing on said tape, means for incrementally moving said tape longitudinally thereof each time that printing is placed thereon, and frame means within which said tape is progressively exposed, a device for placing a time-related inscription on the recording tape of said apparatus to indicate the times when printing is placed on said tape, comprising: a base adapted to be mounted on said apparatus; a constant speed motor mounted on said base; a stylus; and means carried by said base and arranged to support said stylus for writing engagement with the portion of said recording tape exposed within said frame means, said stylus supporting means being operable to move said stylus along a fixed path transversely of said recording tape, and being connected with said constant speed motor so that upon operation of said motor said stylus will be continuously driven and moved by said motor along said fixed path to place a time-related inscription on said tape, said stylus also placing a longitudinal mark on the tape as the tape is incrementally advanced.

2. A device as recited in claim 21, wherein said stylus supporting means is arranged so that said stylus moves reciprocally along a rectilinear path.

3. In an apparatus including a recording tape, means for printing on said tape, and frame means within which said tape is progressively exposed, a device for placing a time-related inscription on the recording tape of said apparatus to indicate the times when printing is placed on said tape, comprising: a base adapted to be mounted on said apparatus; a constant speed motor mounted on said base; a stylus; and means carried by said base and arranged to support said stylus for writing engagement with the portion of said recording tape exposed within said frame means, said stylus supporting means being arranged and operable to move said stylus along a fixed circular path, and being connected with said constant speed motor so that upon operation of said motor said stylus will be continuously driven and moved by said motor along said fixed circular path to place a time-related inscription on said tape.

4. In an apparatus including a recording tape, means for printing on said tape, means for incrementally moving said tape longitudinally thereof each time that printing is placed thereon, and frame means within which said tape is progressively exposed, a device for placing a time-related inscription on the recording tape of said apparatus to indicate the times when printing is placed on said tape, comprising: a base adapted to be mounted on said apparatus; a constant speed motor mounted on said base; a stylus; means carried by said base and arranged to support said stylus for writing engagement with the portion of said recording tape exposed within said frame means, said stylus supporting means being operable to move said stylus reciprocally along a fixed rectilinear path transversely of said tape; and means connecting said constant speed motor with said stylus supporting means, whereby upon activation of said motor said stylus will be continuously driven and moved by said motor along said fixed rectilinear path to place a time-related inscription on said tape, said stylus also placing a longitudinal mark on the tape as the tape is incrementally advanced.

5. A device as recited in claim 4, wherein said stylus supporting means includes: a track supported in spaced relationship from said base; a slide member mounted for reciprocal motion on said track; and means carried by said slide member for receiving said stylus, said slide member being connected by said connecting means to said motor.

6. A device as recited in claim 5, wherein said motor includes an output gear, and wherein said connecting means includes: a drive gear carried by said base, and engageable with said output gear; an eccentric drive pin arranged to rotate with said drive gear; and means connecting said drive pin with said slide members.

7. In an apparatus including a recording tape, means for printing on said tape, means for incrementally moving said tape longitudinally thereof each time that printing is placed thereon, and frame means within which said tape is progressively exposed, a device for placing a time-related inscription on the recording tape of said apparatus to indicate the times when printing is placed on said tape, comprising: a base adapted to be mounted on said apparatus, said base including a mounting plate; a track supported in spaced relationship from said mounting plate to extend transversely above said tape; a constant speed motor mounted on said mounting plate, and including an output gear; a stylus; a slide member mouted for reciprocal movement on said track, and including means arranged to support said stylus for writing engagement with the portion of said recording tape exposed within said frame means; and means for connecting said output gear of said constant speed motor with said reciprocally-mounted slide member, whereby upon operation of said contant speed motor said stylus will be continuously driven and moved by said motor transversely of said tape and will place a time-related inscription on said tape, said stylus also placing a longitudinal mark on the tape as the tape is incrementally advanced.

8. A device as recited in claim 7, where in said last-mentioned means includes: a shaft secured to said mounting plate; a drive gear rotatably mounted on said shaft, and engageable with said motor output gear; an eccentric drive pin arranged to rotate with said drive gear; and linkage means connecting said eccentric drive pin with said slide member.

9. In an apparatus including a recording tape, means for printing on said tape, and frame means within which said tape is progressively exposed, a device for placing a time-related inscription on the recording tape of said apparatus to indicate the times when printing is placed on said tape, comprising: a base adapted to be mounted on said apparatus, said base including a mounting plate; a track supported in spaced relationship from said mounting plate; a constant speed motor mounted on said mounting plate, and including an output gear; a stylus; a slide member mounted for reciprocal movement on said track, and including means arranged to support said stylus for writing engagement with the portion of said recording tape exposed within said frame means; and means for connecting said output gear of said constant speed motor with said reciprocally-mounted slide member, including a shaft secured to said mounting plate; a drive gear rotatably mounted on said shaft, and engageable with said motor output gear; an eccentric drive pin arranged to rotate with said drive gear; and linkage means connecting said eccentric drive pin with said slide member, said linkage means comprising a cross-head secured to said slide member and having a slot therein extending perpendicularly to the longitudinal axis of said track, said eccentric drive pin being received within said slot, whereby upon operaton of said constant speed motor said stylus will be continuously driven and moved by said motor and will place a time-related inscription on said tape.

10. In an apparatus including a recording tape, means for printing on said tape, and frame means within which said tape is progressively exposed, a device for placing a time-related inscription on the recording tape of said apparatus to indicate the times when printing is placed on said tape, comprising: a base adapted to be mounted on said apparatus, said base including a mounting plate; a track supported in spaced relationship from said mounting plate; a constant speed motor mounted on said mounting plate, and including an output gear; a stylus; a slide member mounted for reciprocal movement on said track, and including means arranged to support said stylus for writing engagement with the portion of said recording tape exposed within said frame means; and means for connecting said output gear of said constant speed motor with said reciprocally-mounted slide member, including: a shaft secured to said mounting plate; a drive gear rotatably mounted on said shaft, and slidable axially of said shaft into and out of engagement with said motor output gear; resilient means arranged to urge said drive gear into engagement with said motor output gear; an eccentric drive pin arranged to rotate with said drive gear; and linkage means connecting said eccentric drive pin with said slide member, whereby upon operation of said constant speed motor said stylus will be continuously driven and moved by said motor and will place a time-related inscription on said tape.

11. In an apparatus including a recording tape, means for printing on said tape, and frame means within which said tape is progressively exposed, a device for placing a time-related inscription on the recording tape of said apparatus to indicate the times when printing is placed on said tape, comprising: a base adapted to be mounted on said apparatus, said base including a mounting plate; a constant speed motor mounted on said mounting plate, and including an output gear; a drive gear supported by said mounting plate, and engageable with said motor output gear; a stylus; and means attached to said drive gear for supporting said stylus eccentrically thereof to rotate therewith, and in writing engagement with the portion of said recording tape exposed within said frame means, whereby upon operation of said constant speed motor said stylus will be continuously moved along a fixed circular path and will place a time-related inscription on said recording tape.

12. In combination with a cash register of the type utilizing a recording tape upon which is printed a record of each transaction, said register including a frame within which said tape is progressively exposed as transactions are printed thereon, a device for placing a time-related inscription on the portion of said tape exposed within said frame to indicate the time of occurrence of transactions printed on said tape, including: a base attached to said register; a motor mounted on said base; a stylus; and means carried by said base and arranged to support said stylus for writing engagement with said exposed tape portion, said means being operable to move said stylus along a fixed path, and being connected with said motor so that upon operation of said motor said stylus will be moved along said fixed path.

13. The combination as recited in claim 12, wherein said stylus includes: a cylindrical supporting tube; a writing instrument, including a cylindrical portion slideably received within said cylindrical supporting tube; and means wthin said supporting tube arranged to urge said writing instrument into engagement with said exposed tape portion.

14. In combination with a cash register of the type utilizing a recording tape upon which is printed a record of each transaction, said register including a frame within which said tape is progressively exposed as transactions are printed thereon, a device for placing a time-related inscription on the portion of said tape exposed within said frame to indicate the time of occurrence of transactions printed on said tape, including: a base attached to said register, and including a mounting plate arranged above said frame; a track supported in spaced relationship from the underside of said mounting plate; a motor mounted on said mounting plate, and including an output gear; a stylus; a slide member mounted for reciprocal movement on said track, and including means arranged to support said stylus for writing engagement with said exposed tape portion; and means for connecting said motor output gear with said reciprocally mounted slide member.

15. In combination with a cash register of the type utilizing a recording tape upon which is printed a record of each transaction, said register including a frame within which said tape is progressively exposed as transactions are printed thereon, a device for placing a time-related inscription on the portion of said tape exposed within said frame to indicate the times of occurrence of transactions printed on said tape, including: a base attached to said register, and including a mounting plate arranged above said frame; a track supported in spaced relationship from the underside of said mounting plate; a motor mounted on said mounting plate, and including an output gear; a shaft secured to said mounting plate; a drive gear received on said shaft, and engageable with said motor output gear; a drive pin mounted eccentrically of and arranged to rotate with said drive gear; a stylus; a slide member mounted for reciprocal movement on said track, and including means to receive and support said stylus in writing engagement with said exposed tape portion; and linkage means connecting said drive pin with said slide member.

16. The combination as recited in claim 15, wherein said linkage means comprises a cross-head secured to said slide member and arranged to extend perpendicularly of said track, said cross-head having a slot therein, and said drive pin being received within said slot.

17. The combination as recited in claim 15, further including: a hinge attached at one end to said register, said mounting plate being attached to the other end of said hinge, whereby it can be tilted between a first position wherein said stylus is engaged with said exposed tape portion, and a second position wherein said stylus is removed from said exposed tape portion; a support post carried by one of said mounting plate and said register, and engageable with the other of said mounting plate and said register when said mounting plate is in said first position; and a light unit attached to said hinge, and arranged to illuminate said exposed tape portion.

18. The combination as recited in claim 15, wherein said motor is a synchronous electric clock motor.

19. The combination as recited in claim 15, wherein said drive gear is slideable upon said shaft into and out of engagement with said motor output gear, and including resilient means arranged to urge said drive gear into engagement with said motor output gear.

20. In combination with a cash register of the type utilizing a recording tape upon which is printed a record of each transaction, said register including a frame within which said tape is progressively exposed as transactions are printed thereon, a device for placing a time-related inscription on the portion of said tape exposed within said frame to indicate the times of occurrence of transactions printed on said tape, including: a base attached to said register, and including a mounting plate arranged above said frame, said mounting plate being hingedly mounted for movement toward and away from said frame; a support post carried by one of said mounting plate and said register, and arranged to support said mounting plate in a position confronting said frame; a motor mounted on said mounting plate, and including an output gear; a drive gear carried by said mounting plate, and engageable with said motor output gear; a stylus; and means carried by said drive gear for supporting said stylus eccentrically thereof to rotate therewith, and in writing engagement with said exposed tape portion when said mounting plate is positioned to confront said frame.

References Cited by the Examiner

UNITED STATES PATENTS

| | | | |
|---|---|---|---|
| 617,534 | 1/1899 | Macrae | 346—59 |
| 755,385 | 3/1904 | Parkhurst | 235—2 |
| 935,677 | 10/1909 | Muzzy | 235—2 |
| 1,103,691 | 7/1914 | Schuch | 346—20 |
| 1,356,116 | 10/1920 | Aberegg et al. | 346—50 |
| 2,366,383 | 1/1945 | Cameron | 346—112 |
| 2,496,552 | 2/1950 | Lewis | 346—20 |

RICHARD B. WILKINSON, *Primary Examiner.*

J. G. MURRAY, H. B. KATZ, *Assistant Examiners.*